(12) United States Patent
Lee

(10) Patent No.: US 6,628,210 B2
(45) Date of Patent: Sep. 30, 2003

(54) CONTROL SYSTEM TO PREVENT LANE DEVIATION OF VEHICLE AND CONTROL METHOD THEREOF

(75) Inventor: Young-Seop Lee, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/029,935

(22) Filed: Dec. 31, 2001

(65) Prior Publication Data
US 2002/0198643 A1 Dec. 26, 2002

(30) Foreign Application Priority Data
Jun. 20, 2001 (KR) .................................. 2001-35140

(51) Int. Cl.[7] ............................................. G08G 1/123
(52) U.S. Cl. ................. 340/988; 340/435; 340/436; 340/937; 701/41; 701/28; 701/44; 701/65; 348/135; 348/148; 180/167; 180/168
(58) Field of Search ............................ 340/988, 435, 340/436, 439, 937, 939, 901; 701/41, 44, 65, 28, 301; 348/135, 148, 149; 180/167, 168, 169

(56) References Cited

U.S. PATENT DOCUMENTS

| | | | | |
|---|---|---|---|---|
| 5,926,126 A | * | 7/1999 | Engelman | 340/988 |
| 6,057,754 A | * | 5/2000 | Kinoshita et al. | 340/435 |
| 6,317,057 B1 | * | 11/2001 | Lee | 340/901 |
| 6,324,452 B1 | * | 11/2001 | Ikegaya | 340/439 |
| 6,370,474 B1 | * | 4/2002 | Hiwatashi et al. | 340/436 |

* cited by examiner

Primary Examiner—Daniel J. Wu
Assistant Examiner—Daniel Previl
(74) Attorney, Agent, or Firm—Antonelli, Terry, Stout & Kraus, LLP

(57) ABSTRACT

A method for preventing a vehicle from deviating from a lane is provided, in which precise determinations of whether a vehicle is deviating from a lane may also be made when driving on curved sections of a road. Using DSRC, which is a system enabling communications between a vehicle and roadside equipment, information of road curvature and lane width is received. This road information and setting information of a camera mounted to the vehicle are then used to determine a lane deviation determination standard angle, which is used in curved sections of the road. A difference between the standard angle and a center value of left and right lane marker angles is compared with a critical value to determine whether the vehicle is deviating from the lane.

14 Claims, 5 Drawing Sheets

CONTROL SYSTEM TO PREVENT LANE DEVIATION OF VEHICLE AND CONTROL METHOD THEREOF

BACKGROUND OF THE INVENTION

1. Field of the Invention

The present invention relates to a control system and a method thereof for a vehicle, and more particularly, to a control system to prevent a vehicle from deviating from a lane and a method thereof.

2. Description of the Related Art

A significant amount of research is being performed on control methods and systems for automatically driving vehicles with limited or no driver operation. That is, with the use of electrical sensors that perform various detections in place of what the driver would perceive, differing states of vehicle surroundings and of the vehicle are determined to perform automatic driving of the vehicle. Two of the most difficult aspects of such automatic control are maintaining a specific distance from a vehicle in front of the vehicle being automatically controlled, and preventing deviation from the lane in which the automatically-controlled vehicle is traveling.

In the case of automatic lane deviation prevention, a Gaussian detection method is used. In more detail, lane markers are detected from images obtained by a CCD camera mounted to the vehicle, and it is determined whether the vehicle is deviating from the lane from an angle between left and right lane markers. A warning is typically provided to the driver if the vehicle is deviating from the lane.

Conventional lane marker detection and lane deviation detection is described with reference to FIGS. 6 and 7.

A CDF (Cumulative Distribution Function) is first obtained from input images. In the CDF, points with the largest values in the left and right regions on a basis of 90 degrees are determined to be left and right lane markers. Then, by comparing an amount of deviation from a center of the lane with a predetermined value $\delta$, it is determined whether the vehicle is deviating from the lane. The amount of deviation from the center of the lane is set as a difference between a center value of a left lane marker slant angle and a right lane marker slant angle and 90 degrees. If the difference is greater than the predetermined value $\delta$, it is determined that the vehicle is deviating from the lane and a lane deviation warning is output.

According to the above method, substantially precise determinations of the lane deviation may be made in an area where the road is substantially straight. However in areas where there is a curve in the road, the amount of deviation from the center of the lane of the above method varies according to changes in the amount of curvature and a width of the vehicle. Accordingly, accurate determinations of whether the vehicle is deviating from the lane may only be made in straight sections of the road. In locations where there is a substantial curve in the road as shown in FIG. 7, it may be incorrectly determined that the vehicle is deviating from the lane, in which case a warning may be output to the driver when the vehicle is driving safely, fully within the lane.

SUMMARY OF THE INVENTION

The present invention is a method for preventing a vehicle from deviating from a lane, in which precise determinations of lane deviation can also be made when driving on a curved road.

To achieve precise determinations of lane deviation on a curved road, the present invention prevents a vehicle from deviating from a lane that uses a DSRC (dedicated short range communication) system, which is a system enabling communication between a vehicle and roadside equipment, to receive a curvature of the road and lane width before the vehicle travels in the corresponding section of road. This road information and setting information of a camera mounted on the vehicle are then used to determine a lane deviation determination standard angle, which is used in curved sections of the road. An absolute value of a difference between the standard angle and a center value of left and right lane marker angles is compared with a value $\delta$ to determine whether the vehicle is deviating from the lane.

In more detail, the control method for preventing lane deviation of a vehicle comprises determining a lane deviation determination standard angle; determining a center value of a left lane marker slant angle and a right lane marker slant angle; calculating an absolute value of a difference obtained by subtracting the lane deviation determination standard angle from the center value of the left and right lane marker slant angles; determining if the absolute value of the difference is greater than a predetermined critical value; and determining that the vehicle is deviating from the lane if the absolute value of the difference is greater than the predetermined critical value.

Preferably, the lane deviation determination standard angle is determined from road information including a road curvature and a lane width, and from information obtained from a camera mounted on the vehicle including camera position information and a photographing angle of the camera.

Further, it is preferable that the critical value is determined based on the lane width.

The present invention is also a system for preventing lane deviation of a vehicle comprising: a camera for photographing an area in front of the vehicle; roadside equipment having data on a road curvature and a lane width; onboard equipment for determining a lane deviation determination standard angle using data on the road curvature and the lane width input from the roadside equipment and data on a position of the camera and a photographing angle of the camera; and a lane deviation warning system ECU for determining whether the vehicle is deviating from the lane using the lane deviation determination standard angle and an image photographed by the camera.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
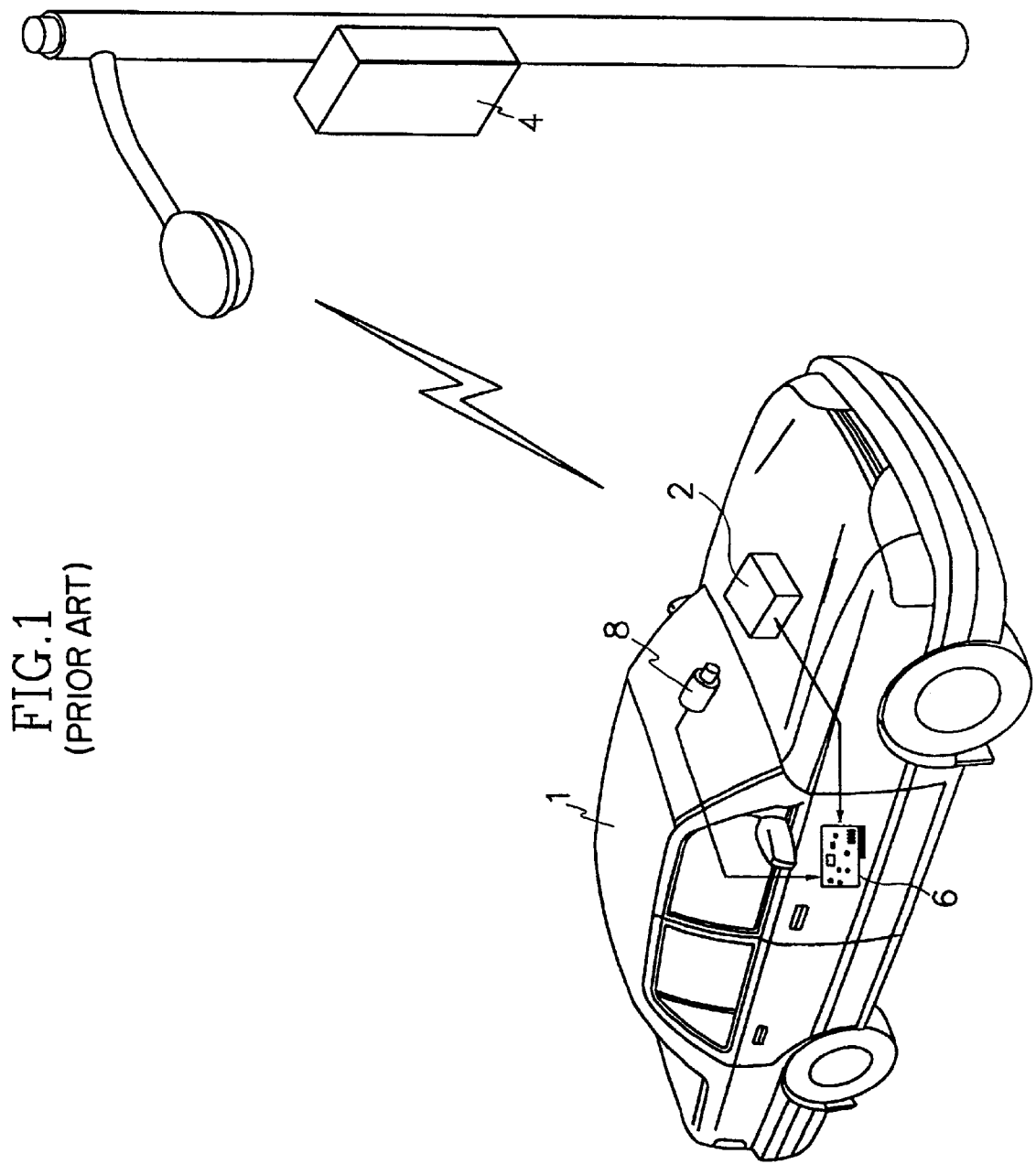
FIG. 1 is a schematic view of a conventional system for preventing lane deviation of a vehicle.

FIG. 1 is a schematic view of a conventional system for preventing lane deviation of a vehicle.

A DSRC (dedicated short range communication) standard is used in the present invention to operate a lane deviation prevention system. The DSRC standard is an ITS (intelligent transportation systems) communication standard, in which information is communicated via wireless communications between OBE (onboard equipment) 2 and RSE (roadside equipment) 4.

In more detail, the RSE 4 is installed in close proximity to a road to enable communication within a range of 3–30 m, and the OBE 2 and a LDWS ECU (lane deviation warning system electronic control unit) 6 are mounted in a vehicle 1. The OBE 2 performs wireless communications with the LDWS ECU 6. A CCD (charge coupled device) camera 8 is also mounted in the vehicle 1 and is connected to the LDWS ECU 6. The CCD camera 8 photographs an area in front of the vehicle 1 then transmits corresponding signals to the LDWS ECU 6.

Figure 2:
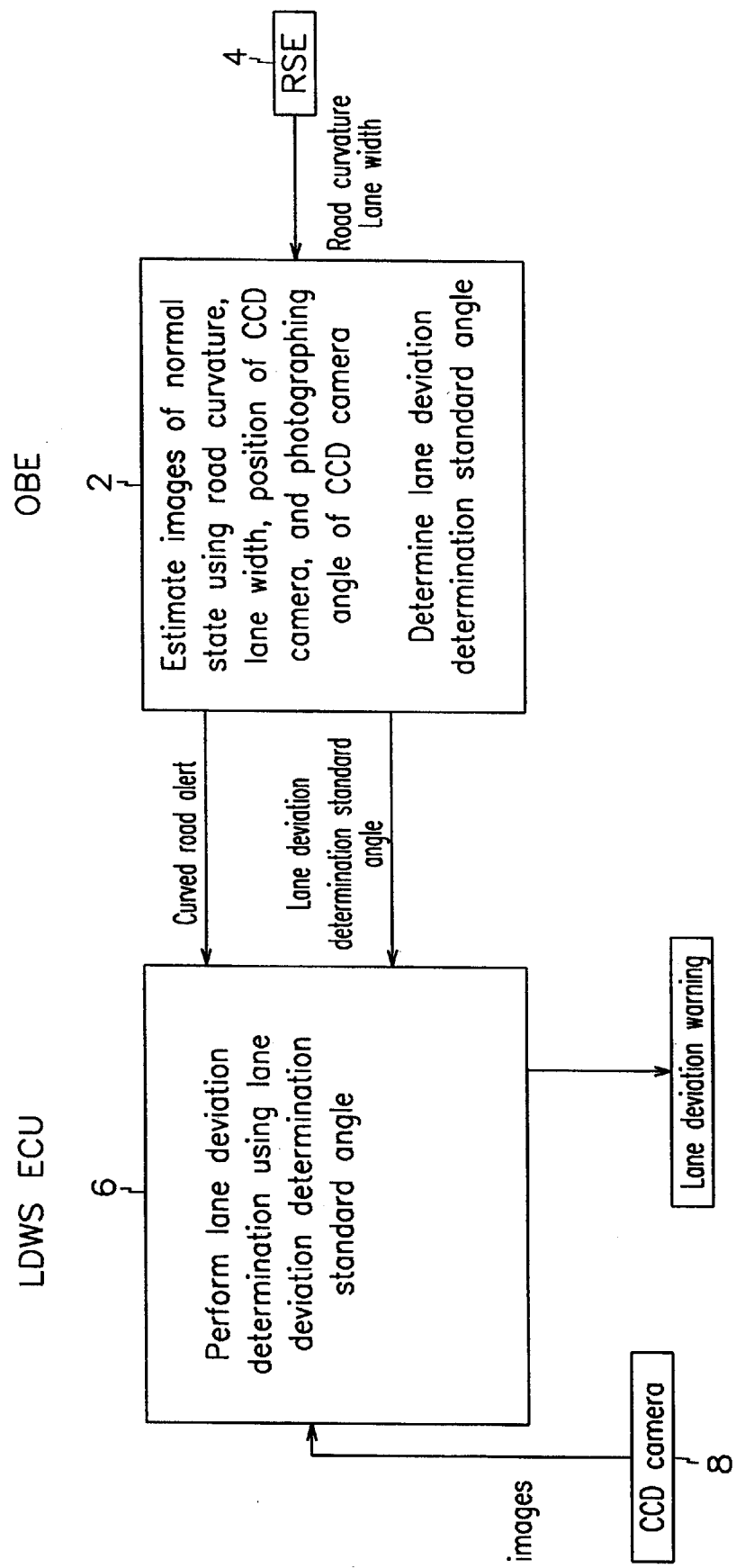
FIG. 2 is a block diagram of a system for preventing lane deviation of a vehicle to which is applied a method according to a preferred embodiment of the present invention.

Processes involved in determining if a vehicle is deviating from a lane using the above system, and outputting a warning if such a determination is made, are now be described with reference to FIG. 2.

Information of a road that the vehicle 1 is traveling on, namely information of road curvature changes and a width between lane markers, is transmitted to the OBE 2 from the RSE 4 via wireless communications. The OBE 2 estimates images of a normal state using a road curvature, a lane width, a position of the CCD camera 8, and a photographing angle of the CCD camera 8. The OBE 2 then uses the estimation to determine a lane deviation determination standard angle.

The lane deviation determination standard angle and information of whether the vehicle is traveling on a curved road are transmitted to the LDWS ECU 6. Images obtained by the CCD camera 8 are also input to the LDWS ECU 6. In the case of driving on a straight section of a road, the LDWS ECU 6 performs lane deviation warning using a fixed critical value. However, if the vehicle 1 is traveling on a curved section of a road, the LDWS ECU 6 performs lane deviation warning using the lane deviation determination standard angle received from the OBE 2.

Figure 3:
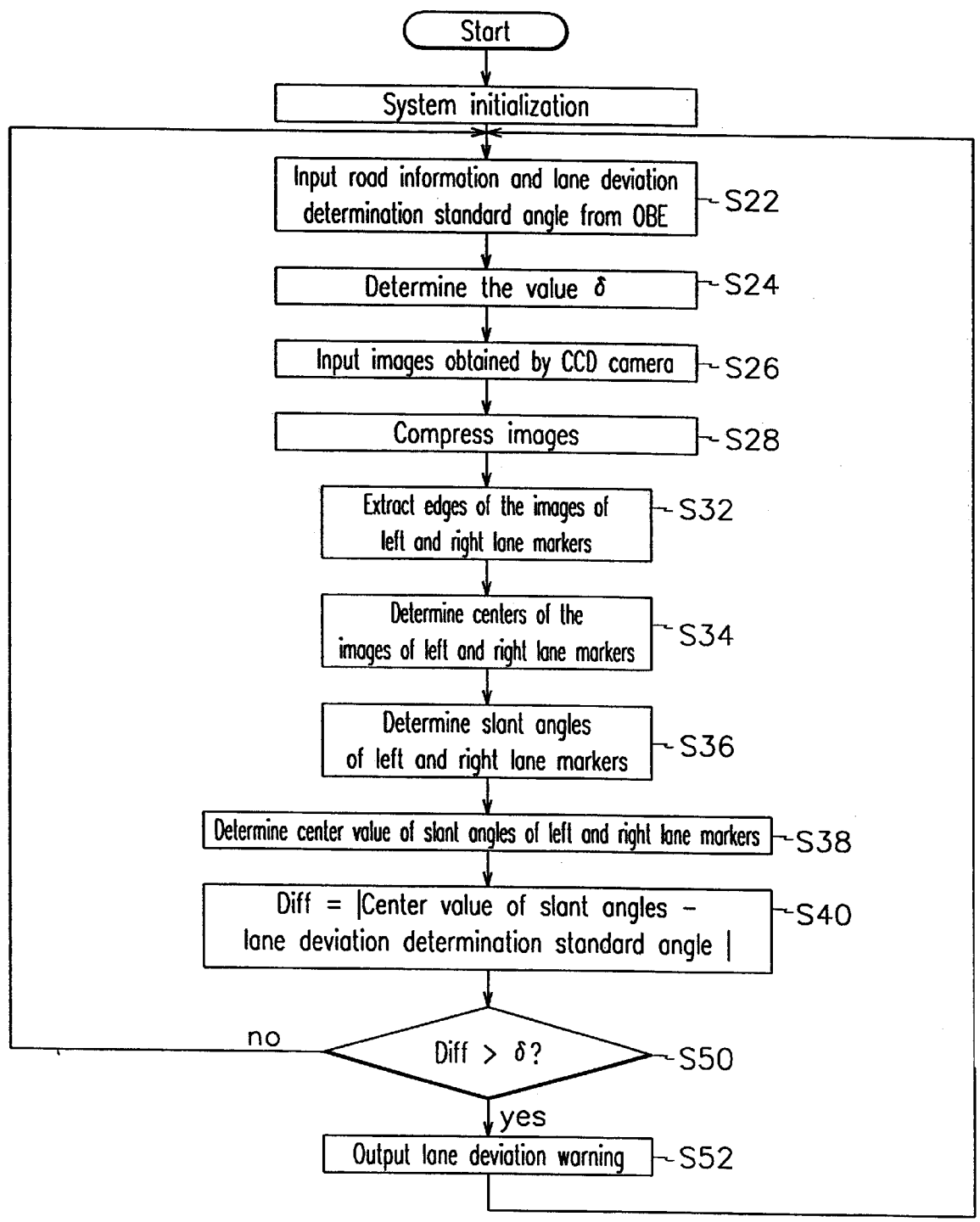
FIG. 3 is a flow chart of a method for preventing lane deviation of a vehicle according to a preferred embodiment of the present invention.

Processes involved in preventing lane deviation of a vehicle are now described in more detail with reference to FIG. 3, which shows a flow chart of a method for preventing lane deviation of a vehicle according to a preferred embodiment of the present invention.

Figure 4:
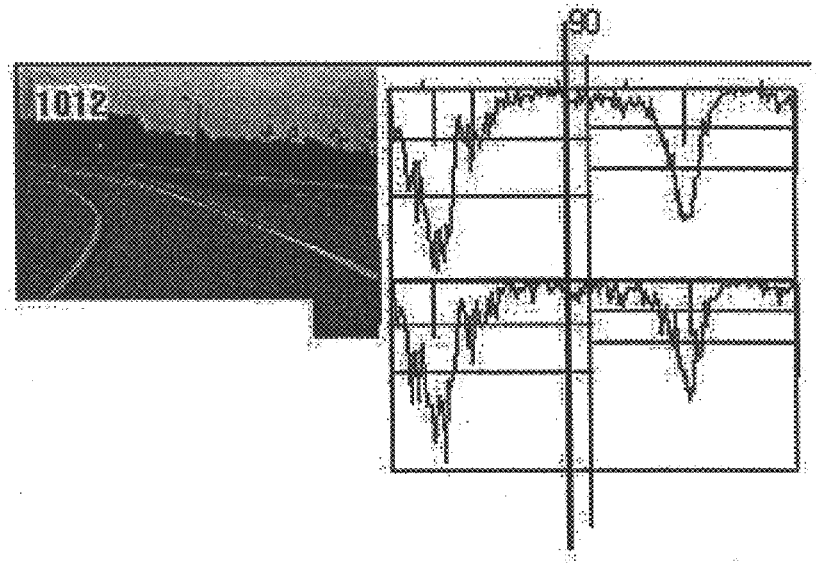
FIGS. 4 and 5 are pictures of differing road conditions and their corresponding graphs obtained by a method for preventing lane deviation of a vehicle according to a preferred embodiment of the present invention.
Figure 5:
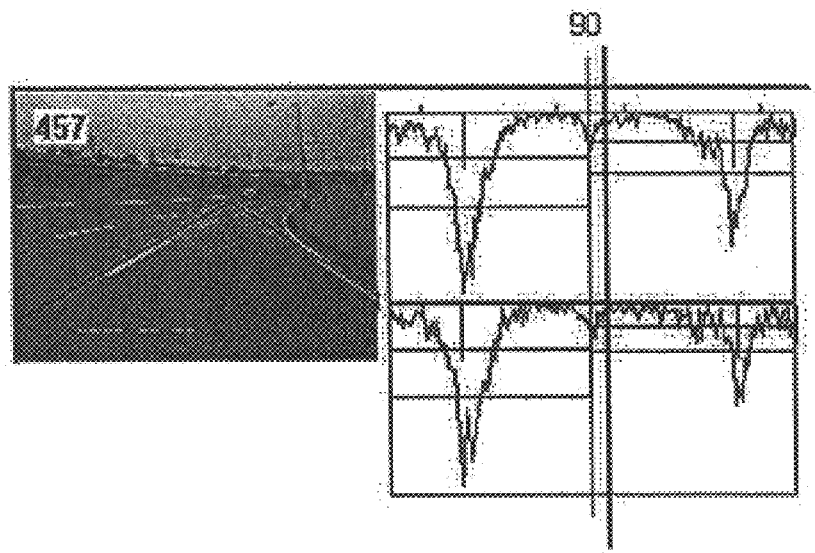
Figure 6:
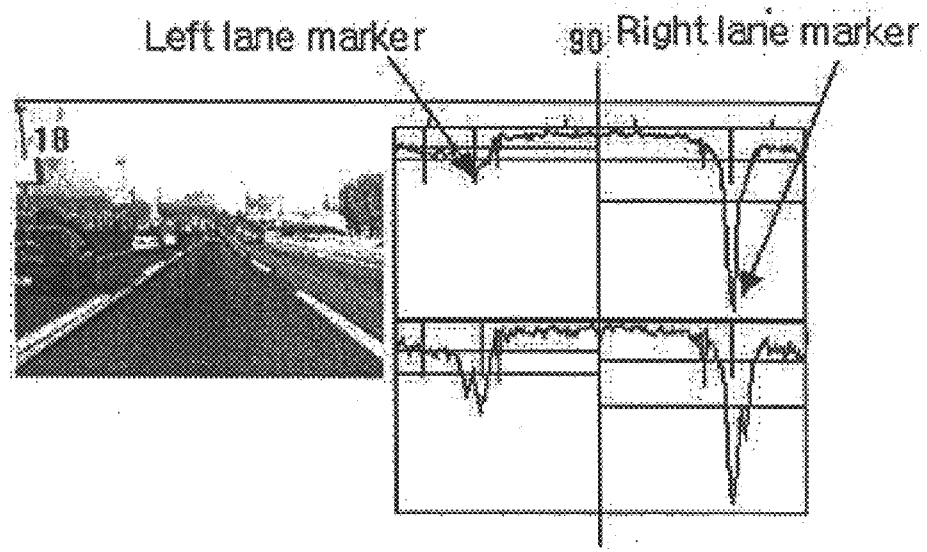
FIGS. 6 and 7 are pictures of differing road conditions and their corresponding graphs obtained by a conventional method for preventing lane deviation of a vehicle.
Figure 7:
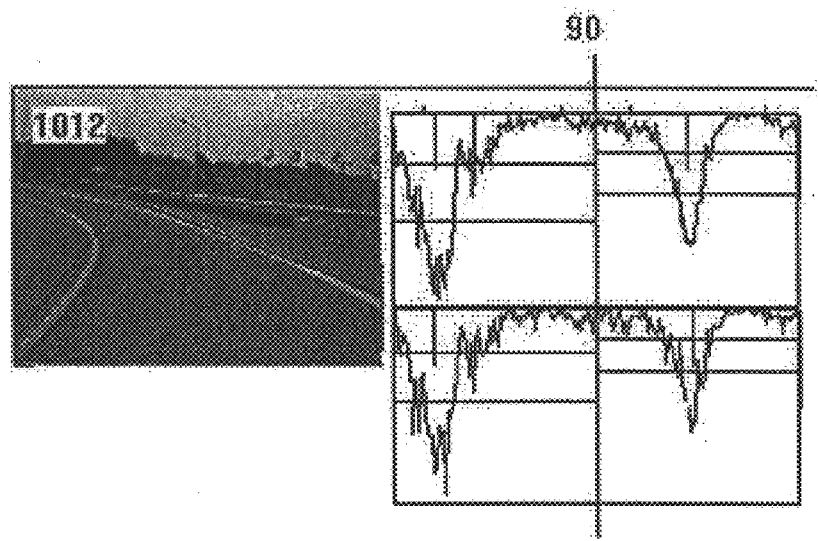

First, the LDWS ECU 6 receives road information and the lane deviation determination standard angle from the OBE 2 (S22). The lane deviation determination standard angle is determined on the basis of the road curvature, the lane width, the position of the CCD camera and the photographing angle of the CCD camera. Therefore, as shown in FIGS. 4 and 5, the lane deviation determination standard angle varies in leftwardly and rightwardly curved sections of a road. That is, in a leftwardly curved section of a road, the lane deviation determination standard angle is less than 90 degrees, while in a rightwardly curved section of a road, the lane deviation determination standard angle is greater than 90 degrees. In a straight section of a road, the lane deviation determination standard angle is equal to 90 degrees.

Using a lane width obtained from the road information, a value $\delta$ is determined in step S24. Further, images obtained by the CCD camera 8 are input to the LDWS ECU 6 in step S26, and the images are compressed in the LDWS ECU 6 in step S28 to thereby perform conversion of the images.

In more detail, edges of a left lane marker and a right lane marker are extracted from the converted images in step S32. Subsequently, a center of the image of the left lane marker and a center of the image of the right lane marker are determined from the images in step S34, then slant angles of the left and right lane markers are determined from the images in step S36. Following step S36, a center value of the slant angles of the left and right lane markers is determined in step S38. Because a method for determining a slant angle of a lane marker is generally known, a further explanation thereof is omitted.

Next, an absolute value of a difference obtained by subtracting the lane deviation determination standard angle from the center value of the slant angles is calculated in step S40. It is then determined if the resulting value of step S40 is greater than the value $\delta$ in step S50. If the condition of step S50 is satisfied, it is determined that the vehicle is deviating from the lane and a warning is output to the driver in step S52. The process is returned to the beginning after step S52, and if the condition of step S50 is not satisfied, step S52 is bypassed and the process is directly returned to the beginning at this stage.

In the method for preventing a vehicle from deviating from a lane of the present invention described above, precise determinations of whether a vehicle is deviating from a lane may also be made when driving on curved sections of a road, thereby providing better operation for automatic driving and enhancing safety.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A control method for preventing lane deviation of a vehicle comprising:

determining a lane deviation determination standard angle;

determining a center value of a left lane marker slant angle and a right lane marker slant angle;

calculating an absolute value of a difference obtained by subtracting the lane deviation determination standard angle from the center value of the left and right lane marker slant angles, and determining if the absolute value of the difference is greater than a predetermined critical value; and determining that the vehicle is deviating from the lane if the absolute value of the difference is greater than the predetermined critical value.

2. The method of claim 1, wherein the lane deviation determination standard angle is determined on the basis of road information and camera information.

3. The method of claim 2, wherein the road information includes a road curvature and a lane width.

4. The method of claim 2, wherein the camera information includes a position of a camera and a photographing angle of the camera.

5. The method of claim 1, wherein the center value determining step comprises:

extracting edges of images of a left lane marker and a right lane marker from images obtained by a camera mounted to the vehicle;

determining slant angles of the left lane marker and the right lane marker by acquiring centers of the images of the left lane marker and the right lane marker; and determining the center value of the left and right lane marker slant angles.

6. The method of claim 1, wherein the predetermined critical value is determined based on a lane width.

7. The method of claim 1, further comprising outputting a lane deviation warning if it is determined that the vehicle is deviating from the lane.

8. A system for preventing lane deviation of a vehicle a camera for photographing an area in front of the vehicle;

roadside equipment having data on a road curvature and a lane width;

onboard equipment for determining a lane deviation determination standard angle using data on the road curvature and the lane width input from the roadside equipment and data on a position of the camera and a photographing angle of the camera; and a lane deviation warning system ECU for determining whether the vehicle is deviating from the lane using the lane deviation determination standard angle and images photographed by the camera, the lane deviation warning system ECU performing determining a lane deviation determination standard angle, determining a center value of a left lane marker slant angle and a right lane marker slant angle, calculating an absolute value of a difference obtained by subtracting the lane deviation determination standard angle from the center value of the left and right lane marker slant angles, and determining if the absolute value of the difference is greater than a predetermined critical value, and determining that the vehicle is deviating from the lane if the absolute value of the difference is greater than the predetermined critical value.

9. The system of claim 8, wherein the lane deviation determination standard angle is determined by the lane deviation warning system ECU on the basis of road information and camera information.

10. The system of claim 9, wherein the road information includes a road curvature and a lane width.

11. The system of claim 10, wherein the camera information includes a position of a camera and a photographing angle of the camera.

12. The system of claim 8, wherein the center value determining step performed by the lane deviation warning system ECU comprises:

extracting edges of images of a left lane marker and a right lane marker from images obtained by a camera mounted to the vehicle;

determining slant angles of the left lane marker and the right lane marker by acquiring centers of the images of the left lane marker and the right lane marker; and determining the center value of the left and right lane marker slant angles.

13. The system of claim 8, wherein the predetermined critical value is determined based on a lane width.

14. The system of claim 8, further comprising the lane deviation warning system ECU outputting a lane deviation warning if it is determined that the vehicle is deviating from the lane.

* * * * *